PLANO-CONVEX, CONTOURED SUBSTRATE HOLDER FOR LEAD ATTACHMENT

Filed May 1, 1967

INVENTORS
GEORGE E. RITTER
EDWIN A. BEAM

United States Patent Office 3,452,915
Patented July 1, 1969

3,452,915
PLANO-CONVEX, CONTOURED SUBSTRATE HOLDER FOR LEAD ATTACHMENT

George E. Ritter and Edwin A. Beam, Carlisle, Pa., assignors to Dynamics Corporation of America, New York, N.Y., a corporation of New York Filed May 1, 1967, Ser. No. 634,927
Int. Cl. B23k *19/00*
U.S. Cl. 228—44 5 Claims

ABSTRACT OF THE DISCLOSURE

A jig for attaching a lead wire to a plano-convex substrate including two flat faced plates which are placed in abutting relationship. One face has a recess designed to accept the convex side of the substrate and the other has a bore hole opposite said recess for passing the lead wire into contact with the plane face of the substrate.

This invention relates generally to a device for attaching a lead to a substrate and more specifically to a jig for attaching a lead to a plano-convex substrate.

A problem exists today in the attaching of lead wires to the substrates which are not of the flat faced type. This particularly occurs in the preparation of piezoelectric devices which often use a flat face on one side thereof and a convex face on the other side. One of the preferred methods of attaching the wire to the substrate is by compression together with the application of high temperatures or the application of ultrasonics for the purpose of completing the bond. It will be obvious that the attachment of the lead wires under such circumstances creates a stress and the problem of maintaining the substrate in position when the wires are attached to the planar side of the substrate.

The present invention provides a means whereby the plano-convex substrate may be held in permanent position with a minimum number of contact points when lead wires are attached to the plano side by means of thermocompression bonding or the like.

Basically, the invention provides two mating substantially flat plates with one plate having a recessed area therein for receiving the substrate. There is provided within the recess means for a point contact support of the substrate as it is resting in the recess. The other plate is provided with a bore hole which is opposite the recessed area in the first plate. The bore hole in the second plate is for receiving a carrying means such as a mandrel for inserting the lead through the bore hole and into contact with the substrate at the point where attachment is desired. When the two plates are firmly secured together and the lead is against the substrate, heat is applied to the entire device while pressure is applied through the mandrel to form a thermocompression bonding. Alternately, ultrasonics could be used instead of the heat and the same bonding effect could be obtained.

The invention will be more clearly understood from the following description when taken in conjunction with the drawings wherein.

Figures 1, 2, 3:
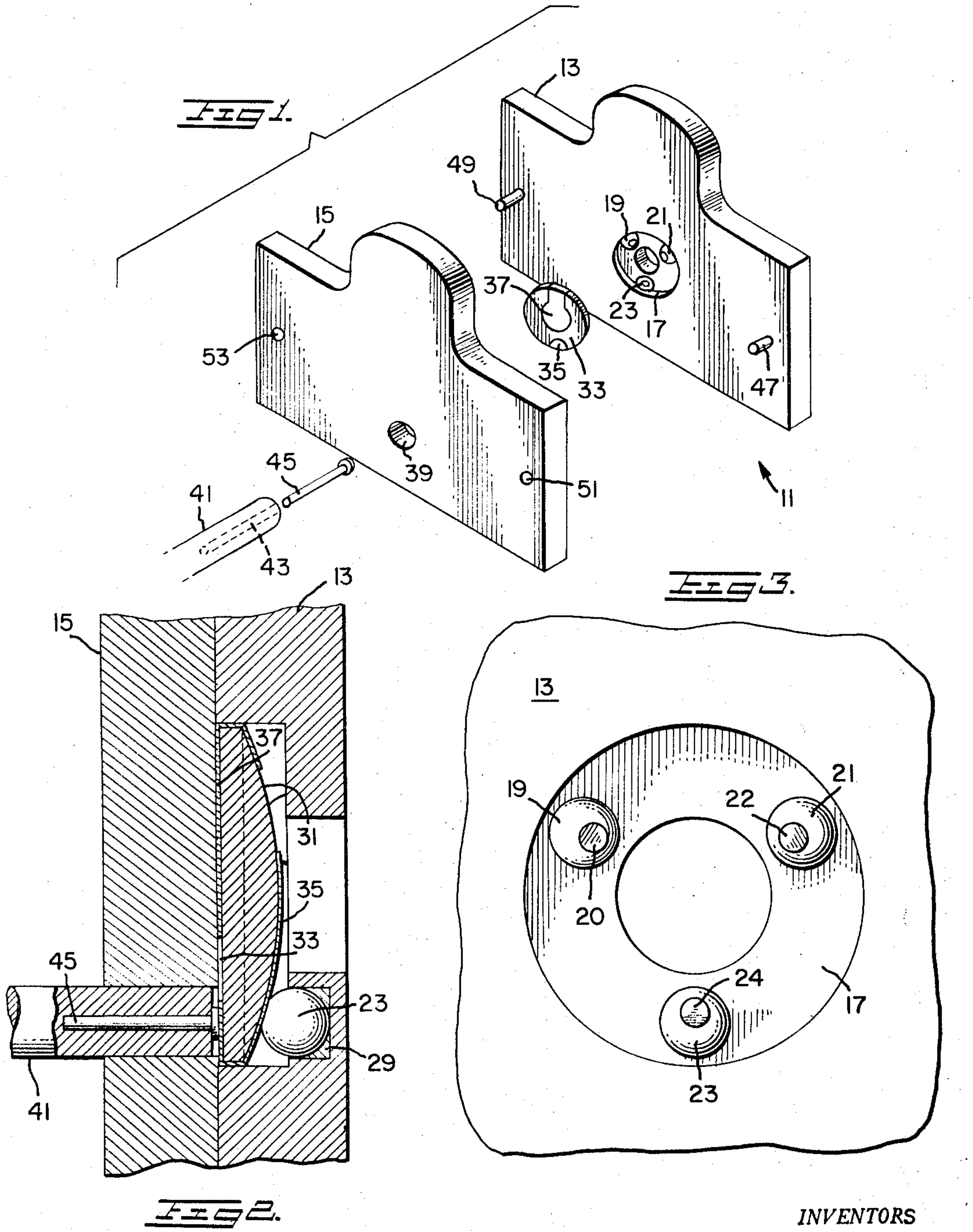
FIG. 1 is an exploded view of the jig structure including the mandrel and substrate.
FIG. 2 is a partial sectional view of the jig with the mandrel and substrate in place.
FIG. 3 is an enlarged view of the recess in the plate shown in FIG. 1.

Turning now more specifically to the drawings, FIG. 1 shows a jig 11 which is comprised of two opposed substantially flat plates 13 and 15.

Plate 13 has a countersunk recessed area 17 substantially in the center portion thereof. Within the recessed area are a plurality of circular metal balls 19, 21 and 23 which may be secured therein by means such as a silver solder 29 as shown more clearly in FIG. 2.

The recess is of such dimension as to accommodate the desired substrate therein. The particular substrate illustrated in the drawings is a piezoelectric crystal device having a flat face 33 and a convex face 31 with electrodes 35 and 37 plated thereon. Since the lead attachment is to be made against the flat planar face 33, the convex surface bears against the inner portion of the recess 17.

It will be noted from FIG. 3 that flat areas or spots 20, 22 and 24 are ground on each of the balls 19, 21 and 23. This flat area is ground at a position on each ball so as to correspond to the diopter of the contoured side of the particular plano-convex, contoured substrate to be used. Therefore, the only contact made with the substrate on the convex side thereof is at the points where the flats occur.

Preferably, and as particularly shown in FIG. 2, one of the balls, such as ball 23, is placed directly opposite the point on the substrate at which the lead 45 is to be attached.

Plate 15 has a bore hole 39 therethrough substantially opposite ball 23 for the reasons explained above. A mandrel 41 having an interior bore hole 43 for acceptance of lead 45 is of a diameter such that it will pass through bore hole 39.

The two plates 13 and 15 may be secured together by any means and are aligned by means such as pegs 47 and 49 and plate 13 which mate with bore holes 51 and 53 in plate 15.

After the jig is secured together with the substrate in place and the lead 45 abutting the metallic electrode 35, the entire device may be placed in an oven so as to be heated to the desired temperature while pressure is applied to the mandrel 41. Because of the thermocompression, the lead 45 is bonded to the electrode 35 on the planar face of the substrate. Additionally, ultrasonics could be used together with the compression to achieve the same bonding feature. The particular pressure producing means and the thermal or ultrasonic producing means may be of any standard type and are not illustrated for purposes of simplicity in the drawings.

It will be obvious that the present jig provides a holder configuration wherein only a few vector forces occur because of a minimum number of contact points, and the substrate may be placed so that the contact area is directly opposite the applied force during the bonding operation.

It is to be understood that the above description and the drawings are illustrative only and that the invention is to be limited only by the scope of the following claims.

We claim:

1. In a jig for attaching a lead wire to a plano-convex substrate comprising,
   - a first plate having a substantially flat face,
   - a recessed area in the flat face of said first plate for receiving said substrate,
   - means in said recessed area for simultaneously bearing against the convex side of said substrate at a plurality of points,
   - a second plate having a substantially flat face,
   - means for securing said plates together so that the flat faces meet,
   - a bore hole in said second plate opposite said recessed area, and
   - means for passing said lead wire through said bore hole and into contact with said substrate.

2. The jig of claim 1 wherein said means in said recessed area comprises, a plurality of spherical elements secured within said recessed area.

3. The jig of claim 2 further comprising flat areas on each of said spherical elements at the point where they contact the convex side of said substrate.

4. The jig of claim 3 wherein one of said spherical elements is so aligned with said bore hole as to be substantially opposite thereto.

5. The jig of claim 1 wherein said means for passing said lead wire through said bore hole comprises, a mandrel, and an axial bore hole in one end of said mandrel for holding said lead wire.

References Cited

UNITED STATES PATENTS

| | | | |
|---|---|---|---|
| 2,754,393 | 7/1956 | Clair | 29—630 |
| 3,277,559 | 10/1966 | Clair | 228—3 |

RICHARD H. EANES, Jr., *Primary Examiner.*